June 17, 1969 — J R. WRIGHT — 3,450,161
DUAL VALVE ACTUATOR
Filed Dec. 12, 1966 — Sheet 1 of 4

INVENTOR.
J RONDLE WRIGHT
BY Donald R. Johnson
ATTORNEY

United States Patent Office 3,450,161
Patented June 17, 1969

3,450,161
DUAL VALVE ACTUATOR
J Rondle Wright, Newtown Square, Pa., assignor to Sun Oil Company, Philadelphia, Pa., a corporation of New Jersey
Filed Dec. 12, 1966, Ser. No. 601,124
Int. Cl. E03b; E03c; F17d
U.S. Cl. 137—636.1   8 Claims

ABSTRACT OF THE DISCLOSURE

Two valves are arranged to be selectively actuated by means of a single camming disc. Rotation of the disc in one direction from a "neutral" position actuates one valve, and rotation in the opposite direction from neutral actuates the other valve.

---

This invention relates to a dual valve actuator, and more particularly to a mechanism for operating two valves independently and selectively by a single source of motive power.

This invention is particularly useful for independently actuating two valves of a gas chromatograph, such as two duplicate valves each of the type disclosed in Young Patent No. 3,223,123, Dec. 14, 1965. Although a single valve of the Young type is capable of performing both column switching (when two separation columns are used in the chromatograph) and sample introduction functions, operating conditions often arise which render it desirable or necessary to separate (in time) the column switching and sample introduction functions; this separation may be accomplished by utilizing two separate valves (one for column switching and the other for sample introduction), which are then operated independently (and selectively). Also, there is a limit, as a practical matter, on the number of ports (connected to passageways within the valve) which can be built into a single valve; using two valves would of course result in an increase in the total number of ports available and would for example enable more separation columns to be utilized. Thus, it will be realized that the use of two valves, rather than one, gives another degree of freedom in the overall design of the chromatograph.

An object of this invention is to provide a novel mechanism for actuating two valves independently by a single source of motive power.

Another object is to provide a mechanism for actuating two valves independently by a reversible electric motor. The use of an electric motor, as contrasted to a more conventional air motor, eliminates the requirements of a supply of compressed air and of solenoid valves to switch the air to the air motor; also, an electric motor is more reliable than an air motor.

The mechanism of this invention effects an operation similar to that effected by a Geneva movement, in that rotation of a motor shaft produces angular movement of another shaft. However, the mechanism of this invention is simpler, more compact, and less expensive than a Geneva movement.

The objects of this invention are accomplished, briefly, in the following manner: A disc has in its surface two semi-circular grooves of different diameters which are connected by a spiral to make a continuous groove. This disc is rotated selectively in one direction or the other by a reversible electric motor. The valves to be actuated are mounted on opposite sides of the disc, and are coupled thereto by operating levers fastened to the valve shafts and carrying pins and rollers which run in the groove.

A detailed description of the invention follows, taken in conjunction with the accompanying drawings, wherein.

Figure 1:
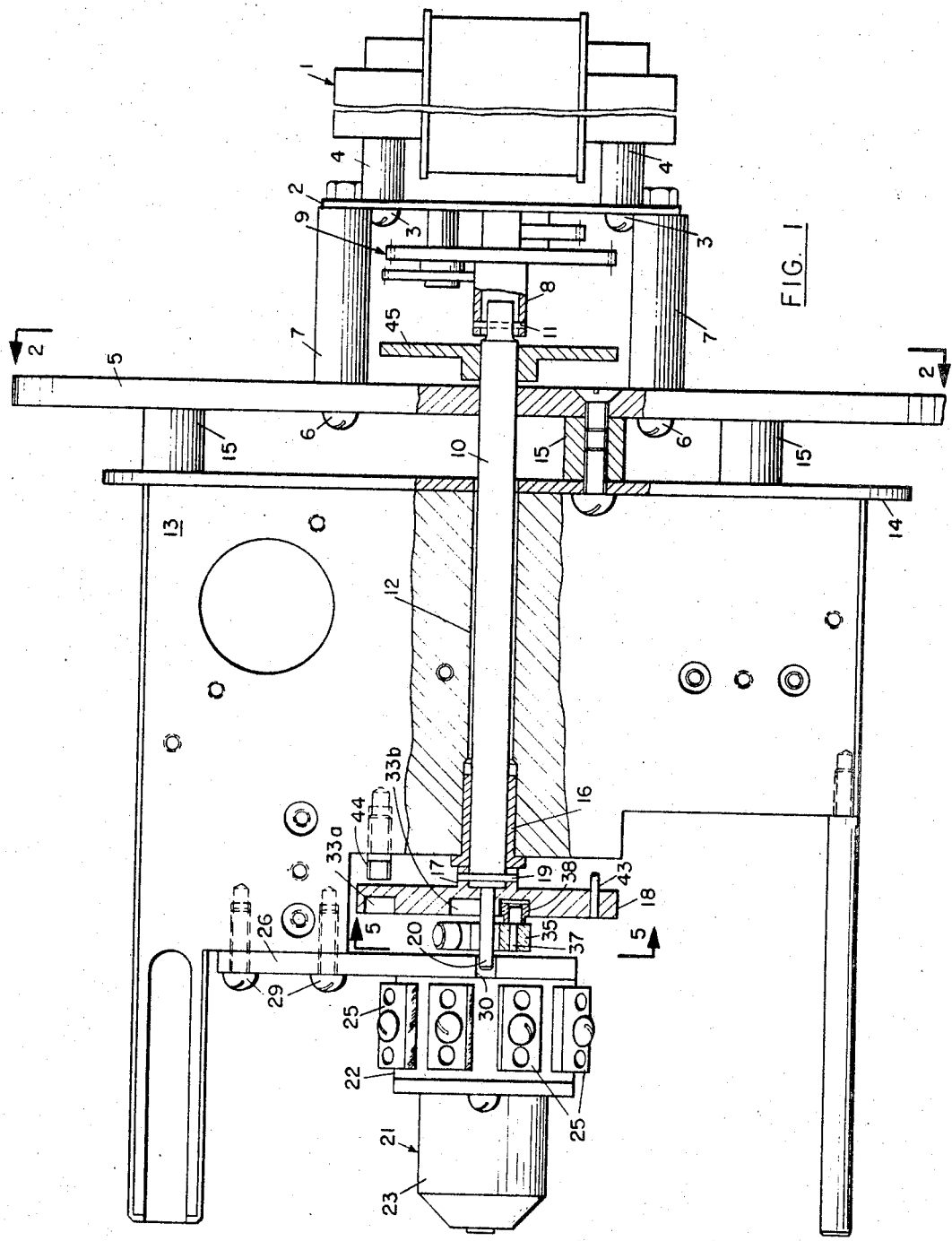
FIG. 1 is a front elevation of a dual valve actuator assembly according to the invention, partially broken away to show interior details.

Referring now to the drawings, a reversible electric drive motor 1 of a commercially-available type serves as a single source of motive power for actuating the valves which are to be operated. Motor 1 is secured to a secondary or subsidiary mounting plate 2 in any suitable manner, for example by screws 3 which pass through plate 2 and threadedly engage mounting elements 4 fastened to the motor.

The mounting plate 2 is secured in spaced, parallel relation to a primary or main mounting plate 5 by means of screws 6 which thread into rigid spacers 7 the other ends of which are threaded and secured by means of nuts to plate 2.

The tubular output shaft 8 of motor 1 is driven through speed reduction gearing indicated generally by numeral 9. The gearing 9 is located between plates 2 and 5. One end of an elongated cylindrical drive shaft 10 is reduced in diameter for a certain distance and is bifurcated. This reduced-diameter end of the shaft 10 projects into the bore of tubular shaft 8, and is rigidly secured to the latter by means of a pin 11 which passes through diametrically-opposite, aligned openings in the wall of tube 8 and through the gap between the two tines of shaft 10. Drive shaft 10 is thus adapted to be driven about its longitudinal axis by motor 1. Shaft 10 passes freely through a hole provided in plate 5 and then through a bore 12 provided in a mounting block 13. One end of the latter is bolted to a disc-like plate 14 which is secured in parallel spaced relation to plate 5 by means of machine screws which engage threaded spacers 15 positioned between plates 5 and 14, as illustrated in FIG. 1. Block 13 is relatively narrow in the direction perpendicular to the paper in FIG. 1, and it is centered on a vertical diameter of plate 14 (see FIG. 3).

At the end of block 13 opposite to plate 14, a flanged bearing 16 is mounted in bore 12, for shaft 10. Shaft 10 extends into a central cylindrical socket 17 formed on the rear circular face of a disc-like camming member 18, which latter may be thought of as a cam disc. Shaft 10 is rigidly secured to cam disc 18 by means of a pin 19 which passes through diametrically-opposite, aligned openings in the wall of socket 17 and through a transverse, diametrically-extending hole in shaft 10. Disc 18 is thus adapted to be driven by shaft 10, about the longitudinal axis of the latter. Beyond the bottom of socket 17 (i.e., to the left thereof in FIG. 1), shaft 10 has an integral coaxial extension 20 of reduced diameter which extends through a hole in cam disc 18, to a point beyond the left-hand or camming circular face thereof.

Figure 3:
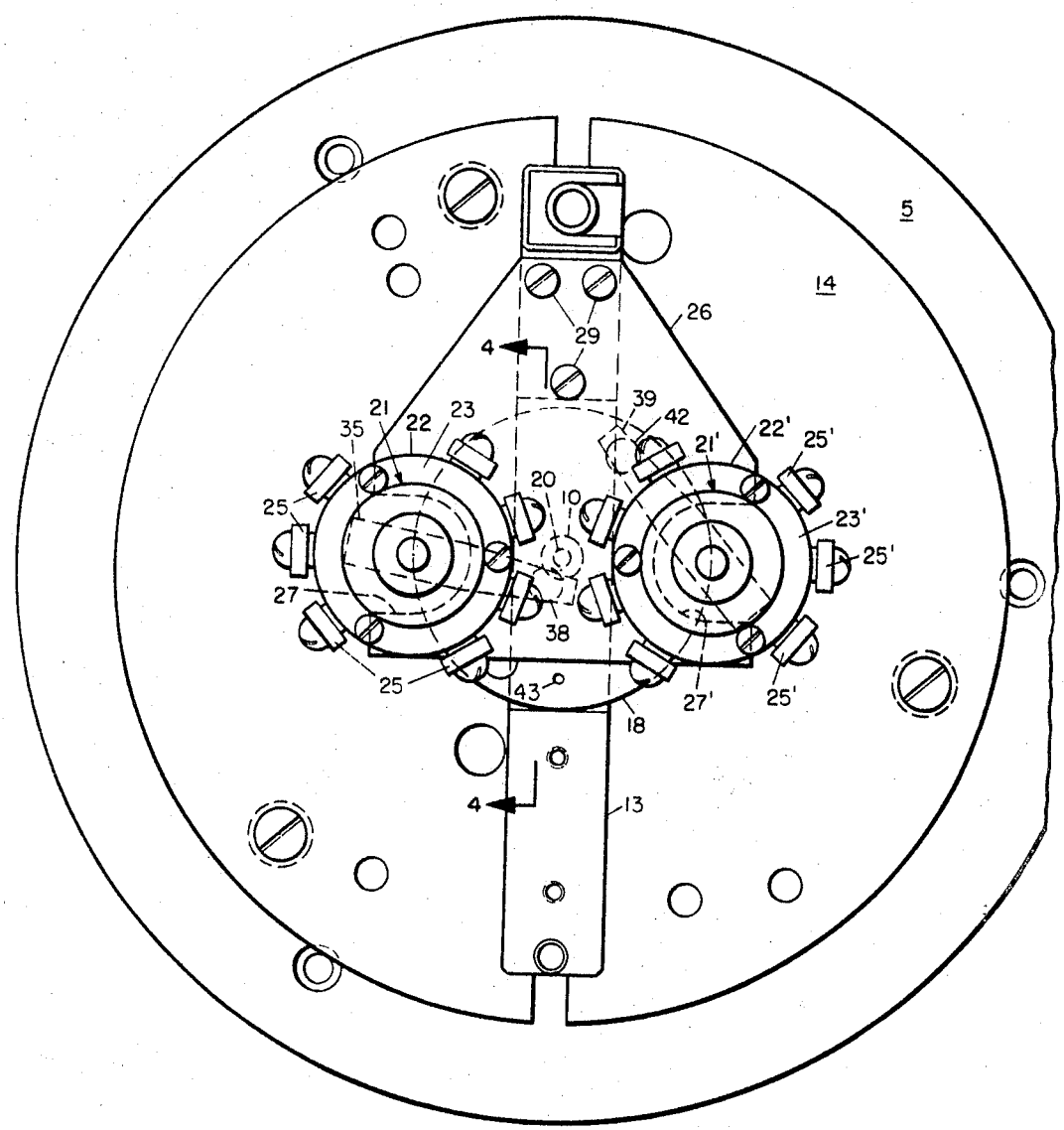
FIG. 3 is an end or side view of the assembly of FIG. 1.
Figure 4:
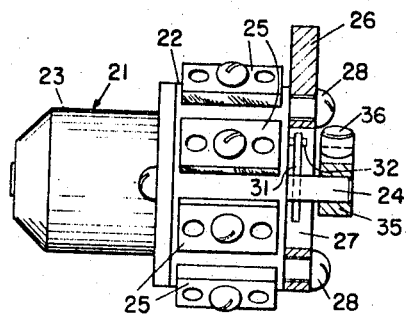
FIG. 4 is a partial sectional view taken along line 4—4 of FIG. 3.

Refer now to FIG. 3. A first valve 21 to be actuated is mounted at one side of cam disc 18 but in front thereof, the "front" direction being toward the left in FIG. 1. A second valve 21' to be actuated is mounted at the other side of cam disc 18, diametrically opposite across this disc from the first valve 21. The valves 21 and 21' are of exactly similar construction, and are preferably of the type disclosed in the above-mentioned patent. Since the valves 21 and 21' are exactly similar in construction, only valve 21 will be described in detail; parts of valve 21' which are similar to those of valve 21 are denoted by the same reference numerals, but carrying prime designations. Valve 21 includes a cylindrical valve body 22, a flanged and domed cover 23, and an actuating shaft 24 (corresponding, respectively, to elements 1, 33, and 39 in the aforementioned patent). See FIG. 4. A plurality (for example, seven) of radially-disposed fitting subassemblies 25 is provided in body 22, for connecting up to fourteen pipes to the valve, also in accordance with the disclosure in the aforementioned patent.

Figure 5:
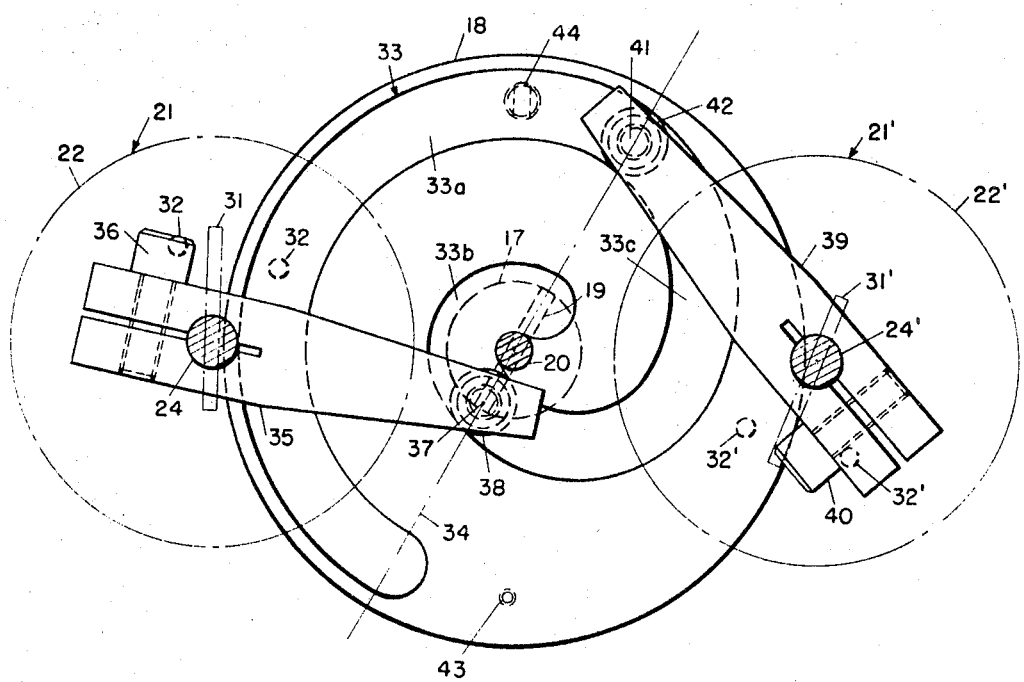
FIG. 5 is a sectional view (on an enlarged scale) taken along line 5—5 of FIG. 1, with certain additional parts shown in phantom.

As shown in FIG. 5, the axis of the actuating shaft 24 of valve 21, the axis of the actuating shaft 24' of valve 21', and the axis of the shaft extension 20 (and of the drive shaft 10) are all parallel to each other, and the centers of shafts 24 and 24' lie at opposite ends of a diameter of cam disc 18. As described in the aforementioned patent, valve 21 is a two-position valve, its actuating shaft 24 being rotatable through a predetermined angle (of about 40°) to shift the valve from one of its two positions to its other position; the same statement applies to valve 21' and its actuating shaft 24'.

A valve mounting plate 26 serves to mount the two valves 21 and 21' in position. Mounting plate 26 is approximately triangular in shape (see FIG. 3), and at each of the two ends of its base has arcuate slots 27 and 27' which surround the respective valves 21 and 21'; each valve is mounted in its respective arcuate slot by means of a pair of screws such as 28 (FIG. 4) which pass through plate 26 adjacent the respective opening and thread into tapped holes provided in the valve body. These last-mentioned tapped holes are shown at 46 in the aforementioned patent. The plate 26 is in turn secured to the front face of mounting block 13 by means of three machine screws 29 which pass through plate 26 and thread into tapped holes in the block. Plate 26 has a hole 30 therein whose center line is collinear with the axis of shaft 10 and with the center of cam disc 18; shaft extension 20 extends into hole 30.

Valve 21 also includes a limit pin 31 fixedly secured to shaft 24; this limit pin cooperates with a pair of stop pins 32 secured to body 22, to provide a positive stop to limit the rotation of shaft 24 to an angular displacement of about 40° (elements 31 and 32 correspond, respectively, to elements 41 and 59 in the aforementioned patent).

The front circular face of cam disc 18 (see FIG. 5) has cut therein a single uninterrupted camming groove which is denoted generally by numeral 33. Groove 33 is formed by a first semicircular groove portion 33a of large diameter and a second semicircular groove portion 33b of small diameter which are joined together by a helical or spiral groove portion 33c, thus providing a single uninterrupted groove having only two ends. The line 34 drawn to connect the two effective ends of groove portion 33a passes through the two effective ends of groove portion 33b, through the center of shaft extension 20, is parallel to the center line of pin 19, and lies at an angle of 29° to the vertical when the cam disc 18 is in the "neutral" position of FIG. 5.

A lever arm 35 mechanically couples the actuating shaft 24 of valve 21 to the camming member 18. At one end, arm 35 is bifurcated (slotted) and has a hole therein through which the outer end of shaft 24 can extend. In order to tightly secure this end of arm 35 to valve shaft 24, the lever arm is slid over the outer end of this shaft (beyond or outside of limit pin 31) and then the arm is tightened on shaft 24 by means of a screw 36 which passes through a clearance hole in one tine of the bifurcation and threads into an aligned tapped hole in the other tine of the bifurcation. Screw 36 thus clamps the two portions of the bifurcated arm 35 together tightly around shaft 24.

At its other end, arm 35 carries a pin 37 which is rigidly secured thereto and whose axis is parallel to the axes of shafts 24 and 10; pin 37 extends outwardly from arm 35, to the rear thereof. In this connection, it will be noted that, in the assembled device, arm 35 is located between mounting plate 26 and cam disc 18 (see FIGS. 1 and 3). A roller 38, having a diameter approximately equal to the width of groove 33, is journaled for rotation on the outer end of pin 37 and fits in groove 33, so as to run therein. FIG. 5 illustrates the cam disc 18 in its "neutral" position; it is arranged for rotation by motor 1 (via shaft 10) through an angle of 180° in either direction from this neutral position. In the neutral position of disc 18, roller 38 is located at the counterclockwise end of groove portion 33b.

A lever arm 39 mechanically couples the actuating shaft 24' of valve 21' to the camming member 18. At one end, arm 39 is bifurcated and has a hole therein through which the outer end of shaft 24' can extend. In order to tightly secure this end of arm 39 to valve shaft 24', the lever arm is slid over the outer end of this shaft (beyond or outside of the limit pin on this shaft) and then the arm is tightened on shaft 24' by means of a screw 40 which passes through a clearance hole in one tine of the bifurcation and threads into an aligned tapped hole in the other tine of the bifurcation. Screw 40 thus clamps the two portions of the bifurcated arm 39 together tightly around shaft 24'.

At its other end, arm 39 carries a pin 41 which is rigidly secured thereto and whose axis is parallel to the axes of shafts 24' and 10; pin 41 extends outwardly from arm 39, to the rear thereof. Arm 39, like arm 35, is located between mounting plate 26 and cam disc 18. A roller 42, having a diameter approximately equal to the width of groove 33, is journaled for rotation on the outer end of pin 41 and fits in groove 33, so as to run therein. In the neutral position of disc 18 illustrated in FIG. 5, roller 42 is located at the clockwise end of groove portion 33a.

As previously stated, cam disc 18 is adapted to be rotated 180° in either direction (depending upon the direction of rotation of reversible motor 1) from the neutral position illustrated in FIG. 5. A mechanical stop is provided, to limit this rotation to 180°, as will now be described. A stop pin 43 is secured to cam disc 18 near the periphery thereof, the axis of this pin being parallel to the axis of shaft 10; this pin extends outwardly from disc 18, to the rear thereof. By way of example, pin 43 is centered on a vertical line when the disc 18 is in the neutral position of FIG. 5, and the axis of this pin is located on an extension of the center line of groove portion 33a. A fixed abutment 44 (for example, in the form of a threaded element which threads into a tapped hole provided in the front face of block 13) extends into the path of travel of stop pin 43, at a location diametrically opposite to the position of pin 43 depicted in FIG. 5; thus, pin 43 comes into engagement with abutment 44 when cam disc 18 has rotated 180° (in either direction) from the FIG. 5 position, preventing further movement of the disc.

As previously stated, FIG. 5 illustrates the cam disc 18 in its neutral position. In this position, both of the two-position valves 21 and 21' (the positions of whose respective actuating shafts 24 and 24' are determined by the respective lever arms 35 and 39) are in their first or "unoperated" positions. When the cam disc 18 is driven 180° clockwise (by motor 1), the roller 38 of arm 35 enters and runs in the spiral groove portion 33c, causing the rotation of this arm in the clockwise direction and actuating valve 21 to its second or "operated" position. During the aforesaid 180° rotation of the disc 18, the roller 42 of arm 39 runs in the constant-diameter groove portion 33a, so that this latter arm does not rotate; thus, valve 21' remains "unoperated." It should be apparent that when the disc 18 returns to "neutral" from this 180° clockwise rotation, arm 35 rotates counterclockwise to return valve 21 to its "unoperated" position.

If, however, the cam disc 18 is driven 180° counterclockwise from its FIG. 5 or neutral position, the roller 42 of arm 39 enters and runs in the spiral groove portion 33c, causing the rotation of this arm in the counterclockwise direction and actuating valve 21' to its second or "operated" position. During this last-mentioned rotation of disc 18, the roller 38 of arm 35 runs in the constant-diameter groove portion 33b, so that this latter arm does not rotate; thus, valve 21 remains "unoperated." It may be seen that when the disc 18 returns to "neutral" from this 180° counterclockwise rotation, arm 39 rotates clockwise to return valve 21' to its "unoperated" position.

It will be noted that the valves 21 and 21' are not operated completely independently. If one valve is "operated," it must be returned to its "unoperated" position (by rotation of disc 18 back to "neutral") before the second valve can be "operated."

In a continuous chromatographic analyzer, the motor 1 would be programmed on a time basis to first rotate cam disc 18 180° in one direction from "neutral," then back to "neutral," then 180° in the opposite direction, then back to "neutral," and so on. This programming would be established in accordance with the desired actuation of the valves 21 and 21', and could be effected by timer-driven cams arranged to operate switches in the energization circuit for motor 1.

At the motor end of shaft 10, and specifically adjacent the reduced-diameter, bifurcated end of this shaft, this shaft has a "flat," and at this "flat" a cam plate 45 (see FIGS. 1 and 2) is attached to shaft 10, as by means of a set screw 46 which threadedly engages a tapped aperture provided in the outstanding hub portion of the plate and which bears against the "flat" or flattened portion of shaft 10. If the center lines of pins 11 and 19 are vertical in the neutral position of cam disc 18, as illustrated in FIG. 1, the center line of set screw 46 is 58° off the vertical in this same position, as illustrated in FIG. 2.

Cam plate 45 is disc-like, but has a flattened portion 47 the center of which lies on the same radius (of plate 45) as the center line of set screw 46. Two limit switches 48 and 49 are mounted on the motor side of mounting plate 5, at diametrically-opposite locations with respect to plate 45, in such positions that their respective rollers (actuating elements) 50 and 51 ride on the substantially cylindrical peripheral surface of plate 45. The arrangement is such that, as cam plate 45 rotates along with shaft 10 (to which the former is secured), the flattened portion 47 of this plate operates (specifically, opens) one of the two switches 48 or 49. In the illustrated neutral position of cam disc 18, the "flat" 47 has come under roller 50 of switch 48, causing opening of the latter. At this time switch 49 is closed, its roller 51 riding on the full radius (rather than a decreased radius, as at "flat" 47) of plate 45.

Figure 2:
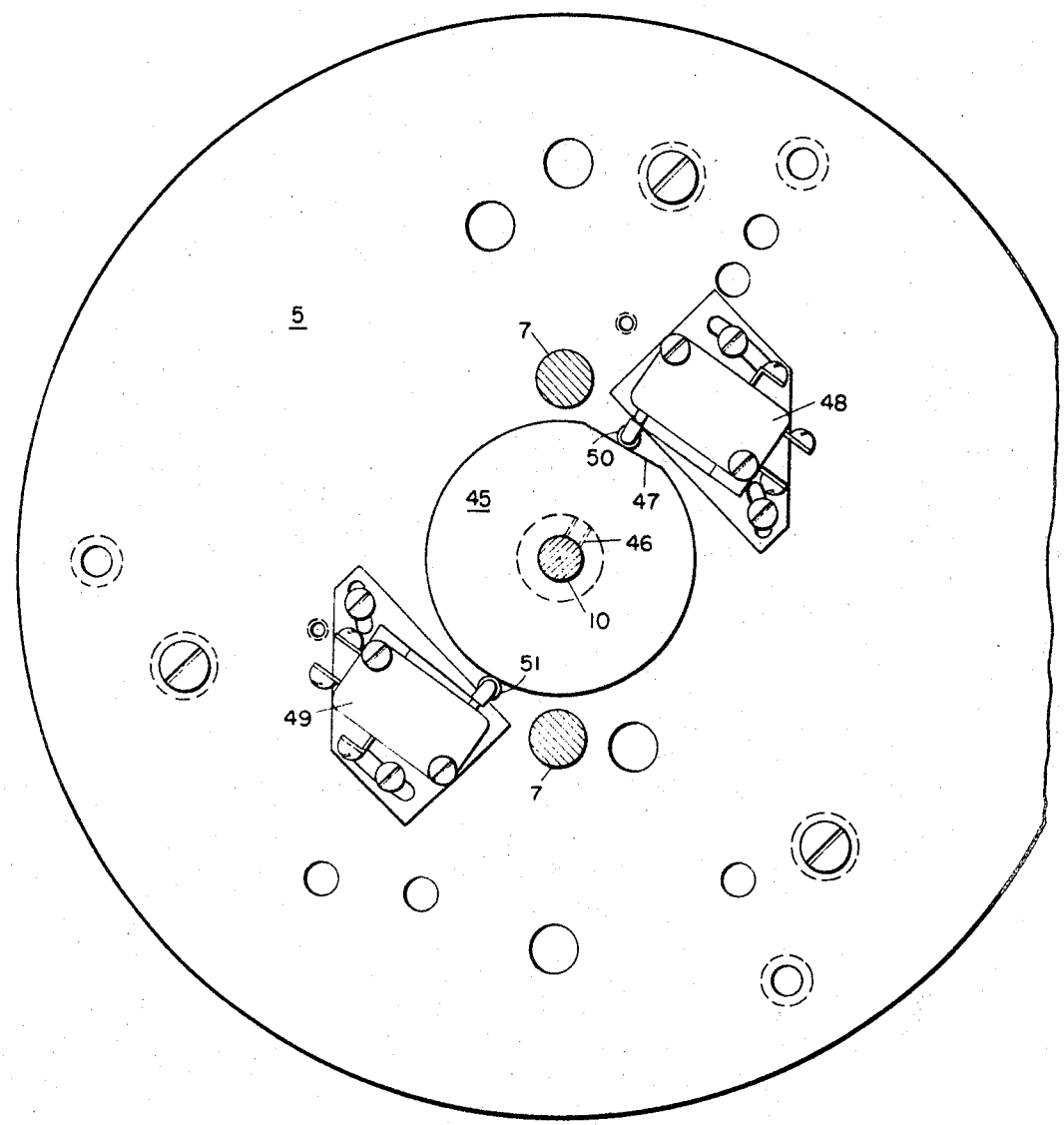
FIG. 2 is a vertical sectional view taken along line 2—2 of FIG. 1.

When cam plate 45 rotates 180° (in either direction) from the neutral position illustrated in FIG. 2, the "flat" 47 comes under roller 51 of switch 49, causing opening of the latter. At this time, switch 48 is closed, its roller 50 riding on the full radius of plate 45.

The limit switches 48 and 49 are electrically connected into circuit with drive motor 1 in such a way that these switches act to stop the cam disc 18 in one of its three positions, to wit, "neutral," clockwise, and counterclockwise. It is believed that the details of these connections will be obvious to those skilled in the art from the foregoing functional description, it being remembered that switch 49 is opened by cam plate 45 in both the clockwise and counterclockwise positions of this plate (corresponding, of course, to the clockwise and counterclockwise positions of cam disc 18).

It is pointed out that the apparatus of this invention includes three different limiting arrangements, so that even if one or more of them fails to operate properly, damage to the assembly is prevented. Thus, in addition to the switches 48 and 49 (which provide an electrical limiting action by control of motor 1), two mechanical stops or limiting arrangements are provided. One of these latter comprises stop pin 43 on disc 18, cooperating with fixed abutment 44; the other comprises the limit pins 31 and 31' which cooperate with stop pins 32 and 32' on the valves 21 and 21', respectively.

The invention claimed is:

1. In combination, a pair of two-position valves to be actuated, each of said two valves having an actuating shaft rotatable through a predetermined angle to shift the corresponding valve from one of its two positions to its other position; a rotatable camming member, a reversible electric motor drivingly coupled to said member, and separate means mechanically coupling each of said shafts to said member for actuation thereby, the overall arrangement being such that said shafts are capable of being rotated as a result of the camming action of said member.

2. Combination according to claim 1, wherein said motor is arranged to rotate said member in one direction or the other with respect to a neutral position, said two shafts being coupled to said member in such a manner that one of said shafts is rotated in response to the rotation of said member in said one direction, and the other of said shafts is rotated in response to the rotation of said member in said other direction.

3. In combination, a pair of two-position valves to be actuated, each of said two valves having an actuating shaft rotatable through a predetermined angle to shift the corresponding valve from one of its positions to its other position; a rotatable camming disc with a single uninterrupted groove cut in one circular face thereof, said groove including two arcuate portions of different diameters and a spiral portion joining together said arcuate portions; means for rotating said disc, and separate means mechanically coupling each of said shafts to said disc for actuation thereby, the overall arrangement being such that said shafts are capable of being rotated as a result of the camming action of said disc.

4. Combination recited in claim 3, wherein the shafts of said valves are positioned at diametrically-opposite sides of said disc.

5. Combination recited in claim 3, wherein the axes of said two shafts are parallel to each other and also to the axis of rotation of said disc.

6. Combination recited in claim 3, wherein the axes of said two shafts are parallel to each other and also to the axis of rotation of said disc, and wherein the shafts of said valves are positioned at diametrically-opposite sides of said disc.

7. Combination recited in claim 3, wherein said separate means each comprises an arm secured to a respective one of said shafts and riding in said groove.

8. Combination set forth in claim 7, wherein the arm for one of said shafts is arranged to ride in one of said arcuate portions or in said spiral portion as said disc rotates, and the arm for the other of said shafts is arranged to ride in the other of said arcuate portions or in said spiral portion as said disc rotates.

References Cited

UNITED STATES PATENTS

| | | | |
|---|---|---|---|
| 1,203,321 | 10/1916 | Fosdick | 137—636.1 |
| 2,033,941 | 3/1936 | Kryzankowski | 137—636.1 |
| 3,011,509 | 12/1961 | Wilson | 137—609 XR |
| 3,021,724 | 2/1962 | Seger | 137—636.1 XR |
| 3,275,036 | 9/1966 | Spencer | 137—636.1 |

STANLEY N. GILREATH, Primary Examiner.

WERNER H. SCHROEDER, Assistant Examiner.

U.S. Cl. X.R.

137—609; 251—254